United States Patent
Hayden

[11] Patent Number: 6,015,499
[45] Date of Patent: Jan. 18, 2000

[54] MEMBRANE-LIKE FILTER ELEMENT FOR CHEMICAL MECHANICAL POLISHING SLURRIES

[75] Inventor: Daniel B. Hayden, Thorntown, Ind.

[73] Assignee: Parker-Hannifin Corporation, Cleveland, Ohio

[21] Appl. No.: 09/062,386

[22] Filed: Apr. 17, 1998

[51] Int. Cl.[7] .............................. B01D 37/00; B24B 1/00; B24B 57/00
[52] U.S. Cl. ........................ 210/767; 210/493.1; 210/499; 451/60; 451/446
[58] Field of Search ..................................... 210/489, 492, 210/493.1, 493.5, 497.01, 499, 500.1, 767; 438/692, 693; 51/307–309; 451/60, 446

[56] References Cited

U.S. PATENT DOCUMENTS

| | | |
|---|---|---|
| 3,852,134 | 12/1974 | Bean . |
| 4,025,679 | 5/1977 | Denny . |
| 4,056,476 | 11/1977 | Mouwen et al. . |
| 4,104,170 | 8/1978 | Nedza . |
| 4,225,642 | 9/1980 | Hirakawa . |
| 4,663,041 | 5/1987 | Miyagi et al. . |
| 4,728,394 | 3/1988 | Shinjou et al. . |
| 4,734,208 | 3/1988 | Pall et al. ................................. 210/767 |
| 4,765,915 | 8/1988 | Diehl ....................................... 210/767 |
| 4,770,785 | 9/1988 | Schaupert . |
| 4,791,144 | 12/1988 | Nagou et al. . |
| 4,795,559 | 1/1989 | Shinjou et al. . |
| 4,863,604 | 9/1989 | Lo et al. . |
| 4,954,142 | 9/1990 | Carr et al. . |
| 5,084,071 | 1/1992 | Nenadic et al. . |
| 5,130,134 | 7/1992 | Noddin et al. . |
| 5,133,878 | 7/1992 | Gsell et al. ............................ 210/767 |
| 5,154,827 | 10/1992 | Ashelin et al. . |
| 5,225,014 | 7/1993 | Ogata et al. . |
| 5,232,875 | 8/1993 | Tuttle et al. . |
| 5,264,010 | 11/1993 | Brancaleoni et al. . |
| 5,275,743 | 1/1994 | Miller et al. ............................ 210/767 |
| 5,314,843 | 5/1994 | Yu et al. . |
| 5,318,927 | 6/1994 | Sandhu et al. . |
| 5,395,801 | 3/1995 | Doan et al. . |
| 5,407,526 | 4/1995 | Danielson et al. . |
| 5,449,917 | 9/1995 | Clements . |
| 5,516,346 | 5/1996 | Cadien et al. . |
| 5,543,047 | 8/1996 | Stoyell et al. . |
| 5,597,443 | 1/1997 | Hempel . |
| 5,607,341 | 3/1997 | Leach . |
| 5,607,718 | 3/1997 | Sasaki et al. . |
| 5,618,227 | 4/1997 | Tsutsumi et al. . |
| 5,637,185 | 6/1997 | Murarka et al. . |
| 5,637,271 | 6/1997 | Suzuki et al. . |
| 5,643,053 | 7/1997 | Shendon . |
| 5,643,406 | 7/1997 | Shimomura et al. . |
| 5,645,682 | 7/1997 | Skrovan . |
| 5,650,039 | 7/1997 | Talieh . |
| 5,655,954 | 8/1997 | Oishi et al. . |
| 5,658,185 | 8/1997 | Morgan, III et al. . |
| 5,665,201 | 9/1997 | Sabota . |
| 5,700,383 | 12/1997 | Feller et al. . |
| 5,705,435 | 1/1998 | Chen . |
| 5,707,274 | 1/1998 | Kim et al. . |
| 5,709,593 | 1/1998 | Guthrie et al. . |
| 5,755,614 | 5/1998 | Adams et al. ............................ 451/60 |
| 5,791,970 | 8/1998 | Yueh ......................................... 451/60 |

OTHER PUBLICATIONS

U.S. application No. 09/062,386, Hayden, filed Apr. 17, 1998.

*Primary Examiner*—Joseph W. Drodge
*Attorney, Agent, or Firm*—John A. Molnar

[57] ABSTRACT

A filter media for physically separating agglomerations of abrasive particles from a chemical-mechanical polishing (CMP) process slurry stream. The media is provided as being formed of at least one fabric sheet having a first and second surface defining a first thickness dimension of the sheet therebetween, with the fabric being woven of polymeric monofilament fibers. In service, the slurry stream is supplied to the first side of the filter media, and is passed through the media to the second side thereof such that at least a substantial portion of the agglomerations of abrasive particles are retained on the first side of the media.

15 Claims, 4 Drawing Sheets

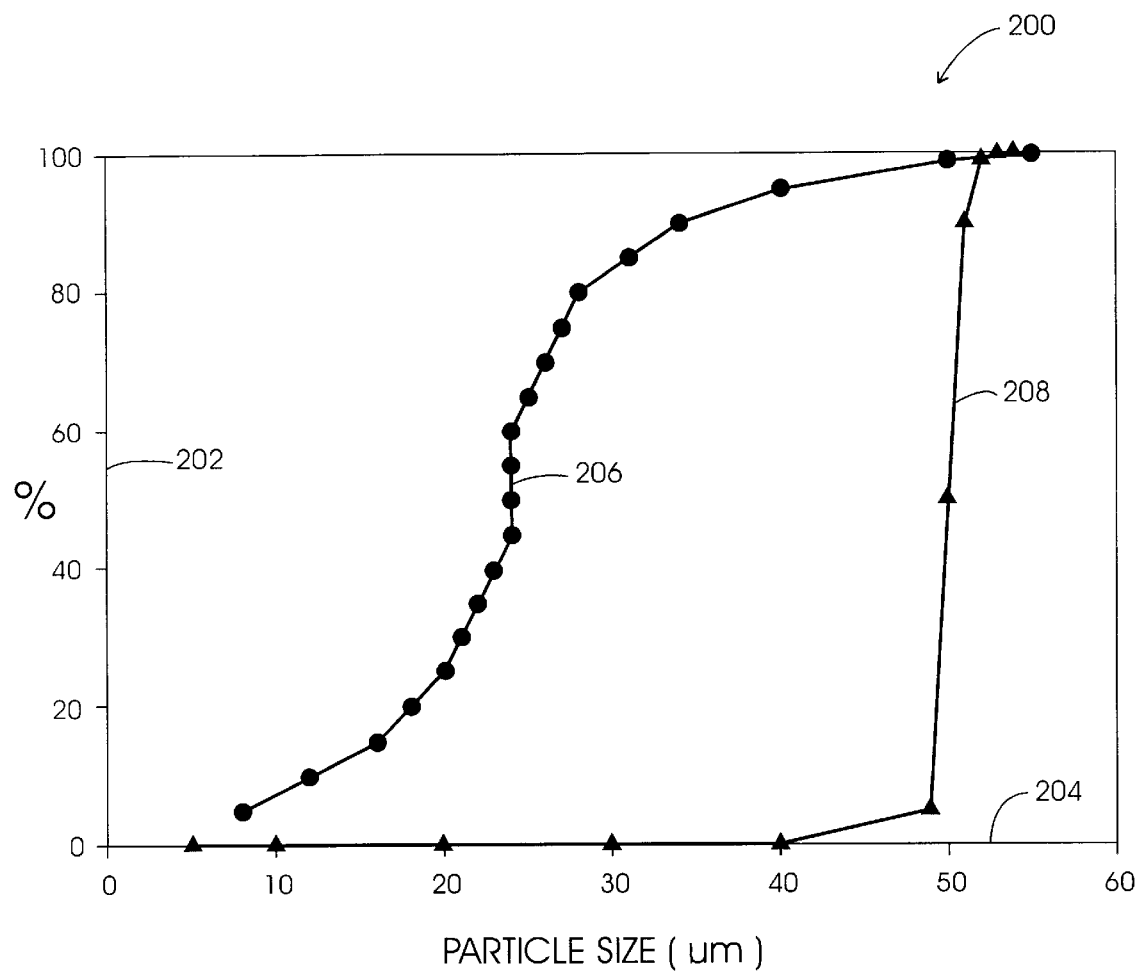

MEMBRANE-LIKE FILTER ELEMENT FOR CHEMICAL MECHANICAL POLISHING SLURRIES

BACKGROUND OF THE INVENTION

The present invention relates broadly to filters for chemical-mechanical polishing (CMP) slurries, and more particularly to a woven fabric filter element therefor which mimics the sieve-like performance of more expensive track-etched membranes but with an improved service life.

In the general mass production of semiconductor devices, hundreds of identical "integrated" circuit traces are photolithographically imaged over several layers on a single semiconducting wafer which, in turn, is cut into hundreds of identical dies or chips. Within each of the die layers, the circuit traces are insulated from the next layer by an insulating material. Inasmuch as it is difficult to photolithographically image a rough surface, it is desirable that the insulating layers are provided as having a smooth surface topography or, as is termed in the vernacular, a high degree of planarity. In this regard, a relatively rough surface topography may result in poor coverage by subsequently deposited layers, and in the formation of voids between layers. As circuit densities in semiconductor dies continue to increase, any such defects become unacceptable and may render the circuit either inoperable or lower its performance to less than optimal.

To achieve the relatively high degree of planarity required for the production of substantially defect free dies, a chemical-mechanical polishing (CMP) process is becoming increasingly popular. Such process involves chemically etching the wafer surface in combination with mechanical polishing or grinding. This combined chemical and mechanical action allows for the controlled removal of material.

In essential operation, CMP is accomplished by holding the semiconductor wafer against a rotating polishing surface, or otherwise moving the wafer relative to the polishing surface, under controlled conditions of temperature, pressure, and chemical composition. The polishing surface, which may be a planar pad formed of a relatively soft and porous material such as a blown polyurethane, is wetted with a chemically reactive and abrasive aqueous slurry. The aqueous slurry, which may be either acidic or basic, typically includes abrasive particles, a reactive chemical agent such as a transition metal chelated salt or an oxidizer, and adjuvants such as solvents, buffers, and passivating agents. Within the slurry, the salt or other agent provides the chemical etching action, with the abrasive particles, in cooperation with the polishing pad, providing the mechanical polishing action. The basic CMP process is further described in the following U.S. Pat. Nos.: 5,709,593; 5,707,274; 5,705,435; 5,700,383; 5,665,201; 5,658,185; 5,655,954; 5,650,039; 5,645,682; 5,643,406; 5,643,053; 5,637,185; 5,618,227; 5,607,718; 5,607,341; 5,597,443; 5,407,526; 5,395,801; 5,314,843; 5,232,875; and 5,084,071.

Looking to FIG. 1, a representative CMP process and apparatus therefor are illustrated schematically at 10. The apparatus 10 includes a wafer carrier, 12, for holding a semiconductor wafer or other workpiece, 14. A soft, resilient pad, 16, is positioned between wafer carrier 12 and wafer 14, with the wafer being held against the pad by a partial vacuum, frictionally, or with an adhesive. Wafer carrier 12 is provided to be continuously rotated by a drive motor, 18, in the direction referenced at 20, and additionally may be reciprocated transversely in the directions referenced at 22. In this regard, the combined rotational and transverse movements of the wafer 14 are intended to reduce the variability in the material removal rate across the work surface 23 of the wafer 14.

Apparatus 10 additionally includes a platen, 24, which is rotated in the direction referenced at 26, and on which is mounted a polishing pad, 28. As compared to wafer 14, platen 24 is provided as having a relatively large surface area to accommodate the translational movement of the wafer on the carrier 12 across the surface of the polishing pad 28.

A supply tube, 30, is mounted above platen 26 to deliver a stream of polishing slurry, referenced at 32, which is dripped or otherwise metered onto the surface of pad 28 from a nozzle or other outlet, 34, of the tube 30. The slurry 32 may be gravity fed from a tank or reservoir (not shown), or otherwise pumped through supply tube 30. Alternatively, slurry 32 may be supplied from below platen 26 such that it flows upwardly through the underside of polishing pad 28.

Slurries for CMP, which are further described in U.S. Pat. Nos. 5,516,346; 5,318,927; 5,264,010; 5,209,816; 4,954,142, may be of either an oxide, i.e., ceramic, or metal abrasive particle type. Common oxide-type particles include silica ($SiO_2$), ceria ($CeO_2$), silicon carbide (SiC), silicon nitride ($Si_3N_4$), iron oxide ($Fe_2O_3$), alumina ($Al_2O_3$), and the like, with common metal particles including tungsten and copper. The slurry typically is formulated to have a very high solids level of between about 10–12% by weight, with a mean average abrasive particle size of between about 0.05–0.3 $\mu$m for oxide slurries and about 20–35 $\mu$m for tungsten slurries.

It has been observed, however, that as a result of agglomeration and drying from exposure to air, larger particles of a particle size of about 50.0 $\mu$m or more may develop within the slurry. Although the metal-type slurries generally are more susceptible to agglomeration than the oxide types, the problem may present in either type of slurry depending upon the slurry composition and ambient conditions. Should the agglomerated particles be entrained within the CMP slurry, significant damage to the to the wafer surface being planarized can result. Moreover, it is known that to achieve a low defect rate and high wafer yield, each successive wafer substrate should be polished under substantially similar conditions.

It therefore has been proposed to filter the CMP process stream at the point of use to separate agglomerated particles of a size larger than a predetermined limit from the balance of the slurry. Initially, filters employing conventional membranes elements, which may be of a phase inversion or bi-axially stretched variety generally having particle retention ratings between about 0.3–0.65 $\mu$m, were suggested. In service, however, membranes filters of such type were observed to load almost instantaneously with particulate and soon were judged unacceptable for the CMP process. The characteristics of conventional membrane filter media are described in greater detail in U.S. Pat. Nos. 5,449,917; 4,863,604; 4,795,559; 4,791,144; 4,770,785; 4,728,394; and 3,852,134.

Alternative filter elements which have met with more success in the CMP process employ fibrous media such as randomly orientated webs. Indeed, unlike membranes which rely on surface-type filtration, these fibrous media utilize a tortuous path, depth-type filtration mechanism. In order to provide acceptable service life, however, a fibrous media must be selected as having a relatively open and permeable structure rated, for example, at about 40–100 $\mu$m absolute or 5–30 µm nominal. Such a rating ensures substantially no retention of particles in the 0.5–2 µm range which could cause cake formation and, ultimately, premature blockage of the filter element. As a drawback, the more open and permeable structure does allow for some passage of large size particles which could damage the substrate being planarized. That is, fibrous media in general characteristically exhibit a gradually decreasing retention profile as a function of decreasing particle size which is in contrast to the sharper particle size cutoff exhibited by membranes and other surface-type media. Depth-type and other filter media are described in further in U.S. Pat. Nos. 5,637,271; 5,225,014; 5,130,134; 4,225,642; and 4,025,679.

In view of the foregoing, it will be appreciated that further improvements in the design of elements for CMP process would be well-received by the semiconductor manufacturing industry. Especially desired would be a filter element exhibiting a particle retention profile which is comparable to surface filtering membranes, but with a service life which is more like that of a depth filtering media.

BROAD STATEMENT OF THE INVENTION

The present invention is directed to a filter element material for chemical-mechanical polishing (CMP) slurries which mimics the separation performance of membranes, but which affords a service life more comparable to that of fibrous, depth-type media. Such material is provided as woven synthetic, i.e., polymeric, fabric having a mesh opening or mean average pore size of between about 50–80 µm. Advantageously, such fabric has a relatively simple matrix with a narrow pore size distributor of ±10%. This distribution results in the filter element exhibiting a more narrowly defined particle size retention profile which is particularly adapted for CMP applications. However, unlike the conventional membrane-type filter elements heretofore known in the art, the woven fabric element of the present invention exhibits an improved service life.

In a preferred embodiment, the filter element of the invention is provided as being formed of a square weave, thermoplastic monofilament fabric having a particle size rating or cutoff of between about 50–70 µm. A particularly preferred fabric is a twill weave polyolefin such as a polypropylene homopolymer, copolymer, or blend having a thickness of between about 150–200 µm and a filament diameter of between about 75–100 µm. For typical CMP process applications, a single sheet of the fabric may be pleated into a cylindrical element configured to be received within a conventional cartridge or other filter assembly.

Advantageously, the separation response of the filter element of the present invention optionally may be modified by calendering the fabric, such as by pressing between the heated, rotating rolls of a roll mill or the like. The gap or nip spacing between the rolls may be set to less than the fabric thickness but greater than the fiber diameter to consolidate the cross-over points or nodes of the fabric network and thereby improve the fabric strength. Alternatively, the spacing may be set to less than the fiber diameter to reduce the size of the interstitial openings or pores between the fibers and to correspondingly reduce the permeability of the fabric. In either the uncalendered or calendered form of the fabric, the square weave structure maximizes the open area for a given pore size.

The present invention, accordingly, comprises material and method possessing the construction, combination of elements, and arrangement of parts and steps which are exemplified in the detailed disclosure to follow. Advantages of the present invention include a woven fabric filter element for CMP process which exhibits a particle retention profile comparable to surface filtering membranes, but with a service life which is more like that of a depth filtering media. Additional advantages include an economical filter element construction which may be used in conventional cartridge and other filter assemblies. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 6 is a theoretical plot, expressed as % versus particle size, which is expected to be representative of the characteristic performance of the woven fabric filter elements of the present invention.

Figure 1:
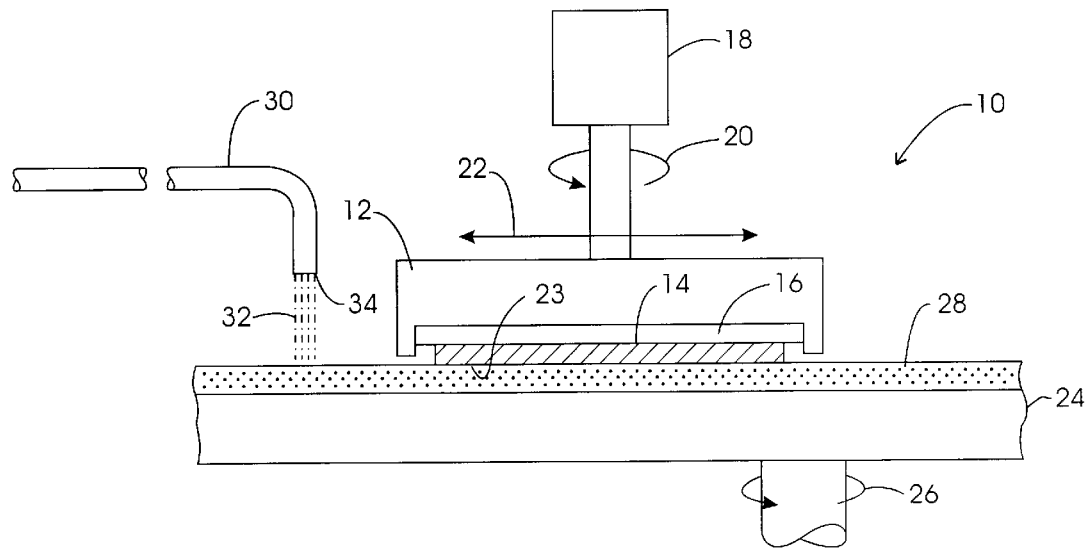
FIG. 1 is a schematic view of a representative CMP process according to the prior art.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "upper" and "lower" designate directions in the drawings to which reference is made, with the terms "inner" or "interior" and "outer" or "exterior" referring, respectively, to directions toward and away from the center of the referenced element, and the terms "radial" and "axial" referring, respectively, to directions perpendicular and parallel to the longitudinal central axis of the referenced element. Terminology of similar import other than the words specifically mentioned above likewise is to be considered as being used for purposes of convenience rather than in any limiting sense.

For the illustrative purposes of the discourse to follow, the filter media of the invention herein involved is described in connection with its use as a filter element within a conventional cartridge filter assembly which may coupled in fluid communication with a chemical-mechanical polishing (CMP) slurry. Assemblies of such type and their construction are described further in commonly-assigned U.S. Pat. No. 5,154,827, and elsewhere in U.S. Pat. Nos. 4,056,476; 4,104,170; 4,663,041; 5,154,827; and 5,543,047. It will be appreciated, however, that aspects of the present invention may find utility in other filter assembles such as capsules having integral media, housings, fittings, and the like. Use within those such other applications therefore should be considered to be expressly within the scope of the present invention.

Figure 2:
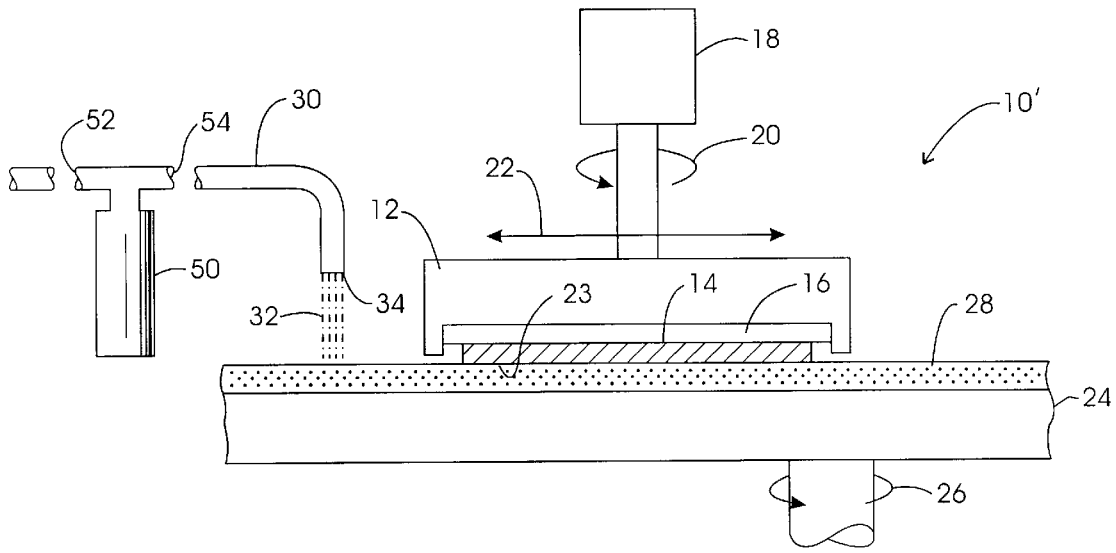
FIG. 2 is a schematic view of the representative CMP process of FIG. 1 as modified in accordance with the present invention to include a filter for treating the polishing slurry process stream.

Referring then to the figures, wherein corresponding reference characters are used to designate corresponding elements throughout the several views, the CMP apparatus 10 of FIG. 1 reappears at 10' in FIG. 2. Apparatus 10' is modified to include a cartridge-type or other filter assembly, 50, for separating agglomerated abrasive particles, which may be 50 μm or more in size, from the balance of the slurry stream 32 otherwise having a mean average particle size of between about 20–35 μm. In the arrangement shown, filter assembly 50 is incorporated into the CMP process at the point of use by its mounting within supply tube 30 upstream of the outlet 34 thereof. Assembly 50 conventionally includes an inlet, referenced at 52, for supplying the untreated slurry stream 32 to the first side of an internal filter media cartridge, and an outlet, referenced at 54, for the discharge of the treated slurry stream passed through the filter media to the second side thereof.

Figure 3:
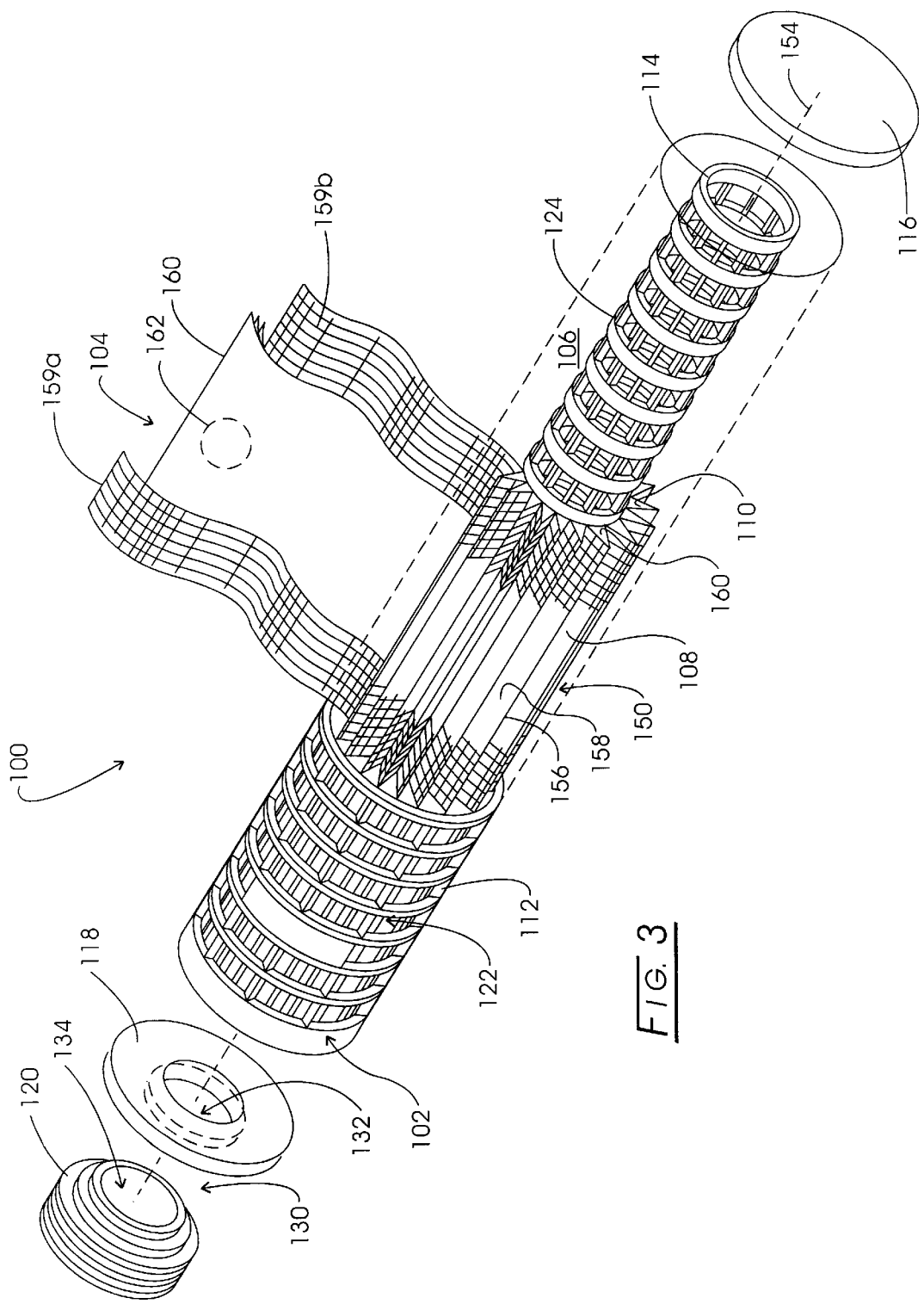
FIG. 3 is an exploded, cut-away view of a representative filter cartridge for the CMP process of FIG. 2 as including a woven fabric filter element according to the present invention.

Turning next to FIG. 3, an exploded view of a filter cartridge adapted to be received within a filter assembly such as assembly 50 of FIG. 2 is shown generally at 100. In basic construction, cartridge 100 includes an annular body, referenced generally at 102, and a filter media, referenced generally at 104, which is supported within the annulus, referenced at 106, of body 102 as having an outer or upstream first side, 108, and an inner or downstream second side, 110. Body 102 is of a conventional design and is formed as having an outer tubular member or cage, 112, a concentrically-disposed, tubular inner member or core, 114, distal and proximal end caps, 116 and 18, respectively, and a proximal end cap fitting, 120. As is shown, cage 112 and core 114 each are highly permeable in being formed as having a plurality of fluid openings, one of which is reference at 122 for cage 112 and at 124 for core 114. With media 104 being retained coaxially within cage 112, core 114 is received through the media for supporting the inner periphery thereof against radially-directed fluid forces.

Each of the components of body 102 are joined, such as with fusion bonding techniques, into a generally cylindrical structure for receiving media assembly 104. In this regard, the components may be molded or otherwise constructed of a melt-processible thermoplastic polymeric material which, depending upon such factors as chemical compatibility and service temperature, may be a fluoropolymer such as fluorinated ethylenepropylene (FEP) or polyfluororalkoxy resin (PFA), or a polyolefin such as polypropylene. Alternatively, the body components may be adhesively bonded or otherwise joined via an interference fit or with mechanical fasteners.

In order that that fluid flowing through cartridge 100 passes through the media 104 for separation, end caps 112 and 114 additionally must be sealed to the media 104. That is, with the cartridge inlet defined by the openings 122 of cage 112, fluid flow may proceed through the media and the openings 124 of core 114 for discharge from the cartridge through an outlet port, 130, defined at the proximal end thereof. Such port is formed in the illustrated embodiment by a central opening, 132, of proximal end cap 118 which is registered axially with a corresponding central opening, 134, of proximal end cap fitting 120. In service, cartridge 100 is sealed at end cap fitting 120 within a filter housing (not shown). Untreated fluid is admitted into the housing via one or more inlet ports formed therein and is exhausted through the outlet port 130 of the cartridge.

For illustrative purposes, media 104 is shown to be configured as a generally cylindrical filter element, referenced generally at 150. Filter element 150 is of a given diameter, typically about 2–3.5 inches (5–9 cm), and extends along a central longitudinal axis, 154, to a typical length of from about 4–10 inches (10–25 cm). Element 150 further is configured as having a plurality of longitudinally-extending, accordion-like pleats, one of which is referenced at 156, to increase the effective filtering area thereof. Each of pleats 156 has a radial outer surface portion, 158, which defines the first side 108 of filter media 104, and a radial inner surface portion, 160, which defines the second side 110 of the media. Within outer cage 112, pleats 156 are protected from deformation by shear or other fluid forces.

In a preferred arrangement, element 150 may be interposed between a pair of drainage layers, 159a–b, with a first or upstream drainage layer, 159a, being disposed adjacent the media first side 108, and second or downstream drainage layer, 159b, being disposed adjacent the media second side 110. Each of drainage layers 159, which conventionally are folded with element 150 to conform to the pleats 156 thereof, preferably are provided as being formed of a very open metal or polymeric mesh material having a pore size, for example, of between about 100–600 μm. Such material particularly may be selected to exhibit a transverse pressure drop, i.e., in a direction parallel to its surface, that is less than the pressure across media 104, i.e., in a direction perpendicular to its surface, for promoting a more uniform distribution of fluid across the corresponding surfaces of element 150.

Element 150 is provided as being fashioned of at least one sheet, 160, of a fabric, referenced at 162, which is sequentially folded to form pleats 156. As may be seen best with momentary reference to the cross-sectional view of FIG. 4, fabric 162 has a first surface, 164, and a second surface, 166, defining a thickness dimension, referenced at "t", therebetween. In accordance with the precepts of the present invention, fabric 162 is provided as being woven of a polymeric monofilament fibers. For most CMP filtering applications, i.e., those involving slurries having a mean average particle size of between about 20–35 μm, a single sheet of fabric having a thickness dimension t of between about 150–200 μm is considered preferred.

Figure 5:
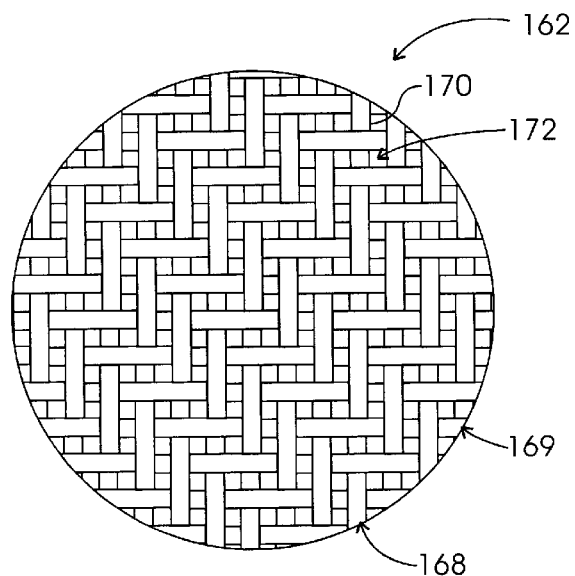
FIG. 5 is a top view of the woven fabric filter element of FIG. 1 which is magnified to reveal the structure of the fabric material thereof.

Looking next to the magnified view of FIG. 5, a preferred construction for fabric 162 is shown as being woven, both the warp, referenced at 168, and filling, referenced at 169, directions, of polymeric monofilament fibers, one of which is referenced at 170, having a fiber diameter of between about 40–100 μm. In this regard, the fiber diameter of the monofilaments 170 is selected to define a pore size, referenced at 172, of between about 50–80 μm. Although plain, i.e., one warp over and one warp under, and other weaves may find utility in some CMP filtering environments applications, a particularly preferred construction for tear resistance is the regular, two up and two down, square twill weave shown in FIG. 5. A square weave pattern is particularly advantages in allowing for a maximum open area per pore size ratio.

Polymeric monofilament fibers suitable for fabric 162 in CMP applications particularly will depend upon the chemical composition of the slurry being handled and on the temperature thereof. Although thermoplastic resins may be preferred for ease of manufacturing, other types of resins may be substituted, however, again as selected for chemical compatibility with the slurry being handled or for desired mechanical or thermal properties. Suitable resins include polyolefins, polyamides, polyesters, aramids, polyacrylonitriles, fluoropolymers, vinyl ethers, polyphenylene sulfides, polyvinylidene chlorides, polyvinyl acetates, polystryenes, polyurethanes, polycarbonates, polyethersulfones, and copolymers and blends thereof. A particularly fabric is a 195 μm thick, 1.9 oz/yd² weight, polypropylene monofilament twill weave having a thread diameter of 85 μm and an average pore size or mesh opening of 74 μm with a 22% open area. One such fabric is marketed commercially under the name "Polypyltex®5-74/22" by Tetko, Inc. of Briarcliff Manor, N.Y.

Continuing with FIG. 6, a theoretical retention profile of filter media 104 as used in conjunction with a tungsten metal particle-type CMP slurry is shown generally at 200 as a function of %, plotted on the axis referenced at 202, versus particle size in the range of about 0–60 μm, plotted on the axis referenced at 204. The particle size distribution of the slurry is given by the curve referenced at 206, as expressed as the percent, either weight or volume, of particles which are less than the corresponding particle size value. For a preferred embodiment of a single sheet of a representative twill weave fabric (e.g., Tetko "Polypyltex®5-74/22") having a thread diameter of about 85 flm, an average pore size of about 74 μm, and a thickness of 195 Vlm, the step function-like profile referenced at 208 is observed which is expressed as the percent of retained particles which are less than the corresponding particle size value. Such profile suggests a particle size cutoff of between about 50–70 μm, and closely mimics the sieve filtration characteristic of track etched or other screen-like membranes, but with a much longer performance life.

Advantageously, the retention profile of filter media 104 according to the present invention may be tailored for specific applications by optionally calendering the fabric sheet, such as by compressing between the heated, rotating rolls of a roll mill or the like. For thermoplastic fabric sheets, the rolls may be maintained at a temperature which is less than the melting point of the resin. "Melting point" is used herein in its broadest sense to include a temperature or temperature range evidencing in the material a transition from a form-stable crystalline or glassy solid phase to a flowable liquid, semi-liquid, or otherwise viscous phase or melt which may be generally characterized as exhibiting intermolecular chain rotation. In this regard, the resins contemplated for the filter media of the present invention typically will exhibit melting points of between about 70–95° C. as determined by means of differential scanning calorimeter (DSC) or differential thermal analysis (DTA). For amorphous or other thermoplastic resins not having a clearly defined melting peak, the term melting point is used interchangeably with glass transition or softening point. With respect to the polypropylene resin specified above having a melting point of about 168° C., the rolls may be maintained at a temperature of between about 85–100° C.

Figure 4:
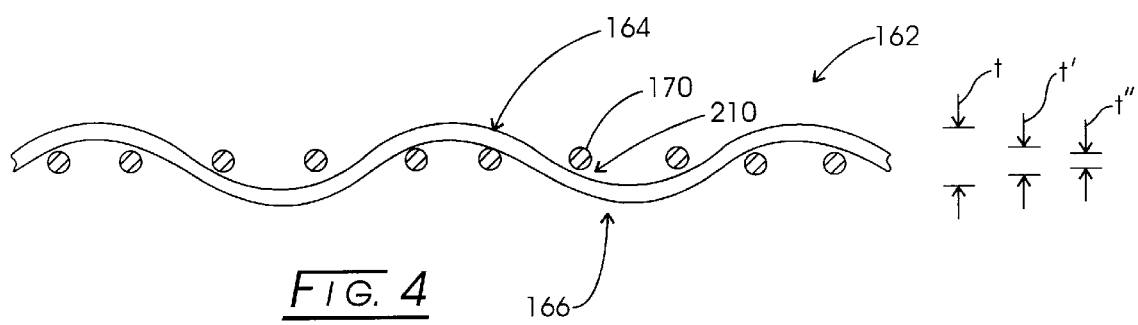
FIG. 4 is a cross-sectional view of the woven fabric filter element of FIG. 1 which is magnified to reveal the structure of the fabric material thereof.

In a first calendered embodiment, the tear strength and other physical properties of the fabric may be improved by setting, with reference to FIG. 4, the gap or nip spacing between the rolls to less than the original fabric thickness t but greater than the fiber diameter. Such spacing is effective to consolidate the cross-over points or nodes, referenced at 210, of the fabric network, and to reduce the fabric thickness t, now referenced at t', by about 25–50% to a nominal value of between about 38–80 μm. Calendered twill fabrics also are manufactured by Tetko, Inc.

Alternatively, in a second calendered embodiment, the spacing may be set to less than the fiber diameter effective to further reduce the fabric thickness t, now referenced at t", to an extent that the original size of the interstitial openings or pores 172 (FIG. 5) between the fibers is reduced by about 20–50% to a nominal value of between about 30–50 μm. In this regard, the permeability of the media is correspondingly affected such, with reference to FIG. 6, that the retention profile thereof may be shifted in the left-hand direction along axis 204 to a reduced particle size cutoff of between about 30–40 μm. Again, the retention profile would be observed to closely mimic the sieve filtration characteristic of track etched or other screen-like membranes, but with a much longer performance life.

Thus, a filter media offering a unique convergence of properties is described which is especially adapted for use in CMP slurries. Such media unexpectedly exhibits a particle retention profile comparable to surface filtering membranes, but with a service life which is more like that of a depth filtering media.

As it is anticipated that certain changes may be made in the present invention without departing from the precepts herein involved, it is intended that all matter contained in the foregoing description shall be interpreted as illustrative and not in a limiting sense. All references cited herein are expressly incorporated by reference.

What is claimed is:

1. A method of physically separating agglomerations of particles of an abrasive having a mean average particle size of between about 20–35 μm from a chemical-mechanical polishing (CMP) process slurry stream while substantially retaining the non-agglomerated particles of said abrasive in the stream, said method comprising the steps of:
   (a) providing a filter media having a first and second side and being formed of at least one sheet of a fabric having a first and second surface defining a thickness dimension of said fabric therebetween, said fabric being woven of polymeric monofilament fibers and having a mean average pore size of between about 50–80 μm;
   (b) supplying the slurry stream to the first side of said filter media; and
   (c) passing the slurry stream through said filter media to the second side thereof whereby at least a portion of the agglomerations of the abrasive are retained on the first side of said media.

2. The method of claim 1 wherein the agglomerations of the abrasive have a mean average particle size of at least about 50 μm.

3. The method of claim 1 wherein the abrasive comprises a material selected from the group consisting of ceramic, metal or metallic oxide materials, or a mixture thereof.

4. The method of claim 1 wherein the thickness dimension of said fabric of step (a) is between about 150–200 μm.

5. The method of claim 1 wherein the polymeric monofilament fibers of said fabric of step (a) have a diameter of between about 40–100 μm.

6. The method of claim 1 wherein said fabric of step (a) is woven of polymeric monofilament fibers selected from the group consisting of polyolefins, polyamides, polyesters, aramids, polyacrylonitriles, fluoropolymers, vinyl ethers, polyphenylene sulfides, polyvinylidene chlorides, polyvinyl acetates, polystryenes, polyurethanes, polycarbonates, polyethersulfones, and copolymers and blends thereof.

7. The method of claim 1 wherein said fabric of step (a) is woven in a square, plain or twill weave pattern.

8. The method of claim 1 wherein said fabric of step (a) is woven of polymeric monofilament fibers selected from the group consisting of polyolefins and copolymers and blends thereof.

9. The method of claim 1 further wherein said fabric of step (a) has been calendered to define the thickness dimension thereof as being about 25–50% less than a first thickness dimension of said fabric.

10. The method of claim 9 wherein the thickness dimension of said fabric of step (a) is between about 38–80 µm.

11. The method of claim 1 wherein said fabric of step (a) has been calendered effective to reduce the pore size of said fabric by about 20–50% less than a first pore size of said fabric.

12. The method of claim 11 wherein the pore size of said fabric of step (a) is between about 30–50 µm.

13. The method of claim 1 wherein said filter media is provided in step (a) as a generally cylindrical filter element having a central longitudinal axis and a plurality of longitudinally-extending, accordion-type pleats formed by sequentially folding said sheet, said pleats having radial outer surface portions formed by the first surface of said sheet and defining the first side of said filter media, and radial inner surface portions formed by the second surface of said sheet and defining the second side of said filter media.

14. The method of claim 13 wherein said filter media is further provided in step (a) as interposed between a first drainage layer disposed on the first side of said filter media, and a second drainage layer disposed on the second side of said filter media, each said drainage layer being folded with said sheet to conform therewith, and being formed of a mesh material for distributing the slurry stream across the first and second surfaces of said filter media.

15. The method of claim 13 wherein said filter element is received within a filter assembly, said assembly being coupled in fluid communication with the slurry stream and having an inlet for supplying the slurry stream to the first side of said filter media, and an outlet for the discharge of the slurry stream passed through said filter media to the second side thereof.

* * * * *